US012574226B2

(12) United States Patent
Shapourian et al.

(10) Patent No.: US 12,574,226 B2
(45) Date of Patent: Mar. 10, 2026

(54) NATIVE CONTINUOUS-VARIABLE QUANTUM REPEATER

(71) Applicant: Cisco Technology, Inc., San Jose, CA (US)

(72) Inventors: Hassan Shapourian, San Mateo, CA (US); Yijia Xu, Greenbelt, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 124 days.

(21) Appl. No.: 18/524,835

(22) Filed: Nov. 30, 2023

(65) Prior Publication Data

US 2025/0184126 A1     Jun. 5, 2025

(51) Int. Cl.
H04L 9/08          (2006.01)
G06N 10/70        (2022.01)

(52) U.S. Cl.
CPC ........... H04L 9/0855 (2013.01); G06N 10/70 (2022.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/0869; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ........ 380/278, 255, 264, 276; 726/2, 21, 36; 713/150, 163, 181
See application file for complete search history.

(56) References Cited

U.S. PATENT DOCUMENTS

| | | | | |
|---|---|---|---|---|
| 5,764,765 A | * | 6/1998 | Phoenix | ................ H04L 9/0858 380/256 |
| 6,748,083 B2 | * | 6/2004 | Hughes | ................. H04L 9/0858 380/278 |
| 7,437,081 B2 | * | 10/2008 | Mitchell | ................ H04B 10/70 398/154 |
| 8,855,316 B2 | * | 10/2014 | Wiseman | .............. H04L 9/0855 380/278 |
| 9,960,465 B2 | * | 5/2018 | Dudley | .............. H01M 50/204 |

(Continued)

FOREIGN PATENT DOCUMENTS

| | | |
|---|---|---|
| KR | 10-2017-0034759 | 3/2017 |
| WO | 2023/122348 A1 | 6/2023 |

OTHER PUBLICATIONS

Brask, et al., "A Hybrid Long-Distance Entanglement Distribution Protocol," Physical Review Letters, Oct. 2010, 6 pages.

(Continued)

*Primary Examiner* — Sharif E Ullah
(74) *Attorney, Agent, or Firm* — Edell, Shapiro & Finnan, LLC

(57)          ABSTRACT

A first device receives a data qumode and at least one auxiliary qumode from a second device. The data qumode and the auxiliary qumode(s) were entangled at the second device. The first device entangles the data qumode and the auxiliary qumode(s) and measures the auxiliary qumode(s). Measuring the auxiliary qumode(s) generates an indication of an error channel experienced by the data qumode. The first device applies an error correction to the data qumode based on the indication of the error channel, and generates a corrected data qumode.

20 Claims, 6 Drawing Sheets

100

(56)　　　　　References Cited

U.S. PATENT DOCUMENTS

| | | | | |
|---|---|---|---|---|
| 10,057,058 | B2 * | 8/2018 | Murakami | H04L 9/0858 |
| 2005/0138352 | A1 * | 6/2005 | Gauvreau | H04L 9/3247 |
| | | | | 713/153 |
| 2005/0221759 | A1 * | 10/2005 | Spadafora | G08G 1/093 |
| | | | | 455/39 |
| 2007/0065154 | A1 * | 3/2007 | Luo | H04J 14/0282 |
| | | | | 398/141 |
| 2007/0076884 | A1 * | 4/2007 | Wellbrock | H04L 9/0855 |
| | | | | 380/263 |
| 2007/0195774 | A1 * | 8/2007 | Sherman | H04L 69/16 |
| | | | | 370/392 |
| 2011/0206204 | A1 * | 8/2011 | Sychev | H04J 14/06 |
| | | | | 380/256 |
| 2011/0213979 | A1 * | 9/2011 | Wiseman | H04L 9/0844 |
| | | | | 713/171 |
| 2014/0010234 | A1 * | 1/2014 | Patel | H04L 45/74 |
| | | | | 370/392 |
| 2014/0068765 | A1 * | 3/2014 | Choi | H04L 63/1416 |
| | | | | 726/23 |
| 2014/0133652 | A1 * | 5/2014 | Oshida | H04L 9/0897 |
| | | | | 380/255 |
| 2016/0155327 | A1 * | 6/2016 | Schlienz | G08G 1/096791 |
| | | | | 340/907 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2017/0338952 | A1 * | 11/2017 | Hong | H04L 9/083 |
| 2018/0176091 | A1 * | 6/2018 | Yoon | H04L 5/1446 |
| 2019/0036821 | A1 * | 1/2019 | Levy | G06F 12/0868 |
| 2019/0260581 | A1 * | 8/2019 | Su | H04L 9/08 |
| 2019/0349392 | A1 * | 11/2019 | Wetterwald | H04L 43/0852 |
| 2020/0084222 | A1 * | 3/2020 | William | H04L 63/12 |
| 2022/0360434 | A1 * | 11/2022 | Choi | H04L 63/061 |
| 2023/0206110 | A1 | 6/2023 | Jiang et al. | |

OTHER PUBLICATIONS

Noh, et al., "Encoding an Oscillator into Many Oscillators," Physical Review Letters, vol. 125, Issue 8, Aug. 2020, 24 pages.
Van Loock, "Optical hybrid approaches to quantum information," Laser & Photonics Reviews, Aug. 2018, 35 pages.
Wu, et al., "Continuous-variable quantum repeaters based on bosonic error-correction and teleportation: architecture and applications," Quantum Science and Technology, vol. 7, No. 2, Mar. 2022, 27 pages.
Cai, et al., "Bosonic quantum error correction codes in superconducting quantum circuits," Fundamental Research, vol. 1, Issue 1, Jan. 2021, 23 pages.
Rozpedek, et al., "Quantum repeaters based on concatenated bosonic and discrete-variable quantum codes," npj Quantum Information 7:102, Jun. 2021, 12 pages.

* cited by examiner

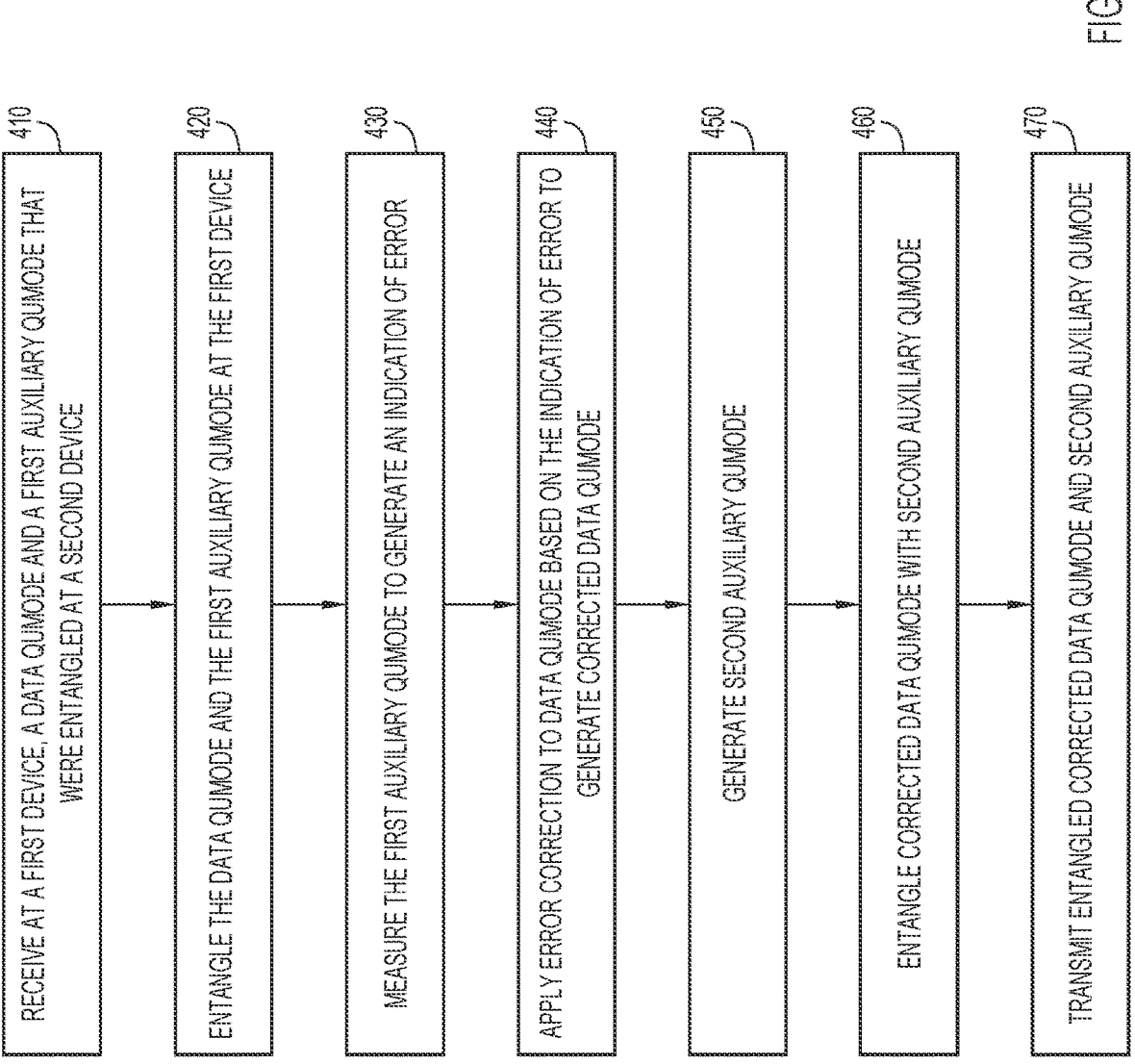

410 — RECEIVE AT A FIRST DEVICE, A DATA QUMODE AND A FIRST AUXILIARY QUMODE THAT WERE ENTANGLED AT A SECOND DEVICE

420 — ENTANGLE THE DATA QUMODE AND THE FIRST AUXILIARY QUMODE AT THE FIRST DEVICE

430 — MEASURE THE FIRST AUXILIARY QUMODE TO GENERATE AN INDICATION OF ERROR

440 — APPLY ERROR CORRECTION TO DATA QUMODE BASED ON THE INDICATION OF ERROR TO GENERATE CORRECTED DATA QUMODE

450 — GENERATE SECOND AUXILIARY QUMODE

460 — ENTANGLE CORRECTED DATA QUMODE WITH SECOND AUXILIARY QUMODE

470 — TRANSMIT ENTANGLED CORRECTED DATA QUMODE AND SECOND AUXILIARY QUMODE

NATIVE CONTINUOUS-VARIABLE QUANTUM REPEATER

TECHNICAL FIELD

The present disclosure relates to quantum computation and communication, specifically using continuous-variable encoding.

BACKGROUND

Exchanging quantum information, i.e., quantum communication, provides the underlying basis for a wide area quantum network, or quantum internet. Noisy transmission channels and signal attenuation hamper direct transmission of quantum signals, and significantly limit the possibility of long-distance quantum communication. Fundamental physical constraints of quantum physics (e.g., the no-cloning theorem) prevent typical classical solutions, such as simple signal amplification.

BRIEF DESCRIPTION OF THE DRAWINGS

FIG. 4 is a flowchart illustrating operations performed by a quantum repeater to mitigate error in a received quantum signal and retransmit the quantum signal, according to an example embodiment.

DETAILED DESCRIPTION

Overview

A method is provided for error correction of a data qumode using an entangled auxiliary qumode. The method includes receiving at a first device, a data qumode and a first auxiliary qumode from a second device. The data qumode and the first auxiliary qumode were entangled at the second device. The method also includes entangling the data qumode and the first auxiliary qumode at the first device and measuring the first auxiliary qumode. Measuring the first auxiliary qumode generates an indication of an error channel experienced by the data qumode. The first device applies an error correction to the data qumode based on the indication of the error channel, and generates a corrected data qumode.

EXAMPLE EMBODIMENTS

Quantum repeaters have been proposed to provide long distance communication by applying a quantum error correction protocol at each quantum repeater. These quantum error correction protocols typically operate to recover qubits in the quantum signal, i.e., digital quantum communication. The techniques presented herein provide for a repeater that operates with continuous variable (CV) quantum states, which may encode continuous quantum information in an analog fashion using qumodes based on coherent quantum communication schemes. The qumodes carry information through harmonic oscillators (e.g., electromagnetic waves in vacuum) with quadrature operators (e.g., $\hat{x}$ and $\hat{p}$) that can encode the information in a typical modulation format, such as Quadrature Amplitude Modulation (QAM). A qumode may be measured by a homodyne detector to project the qumode onto the eigenstates of a quadrature operator. By entangling an encoded data qumode with an auxiliary qumode, both before and after transmission, each repeater reduces the noise caused by an error channel (i.e., improves the Signal-to-Noise Ratio (SNR) of the data qumode) that may affect the data qumode encoding the data signal during transmission.

Figure 1:
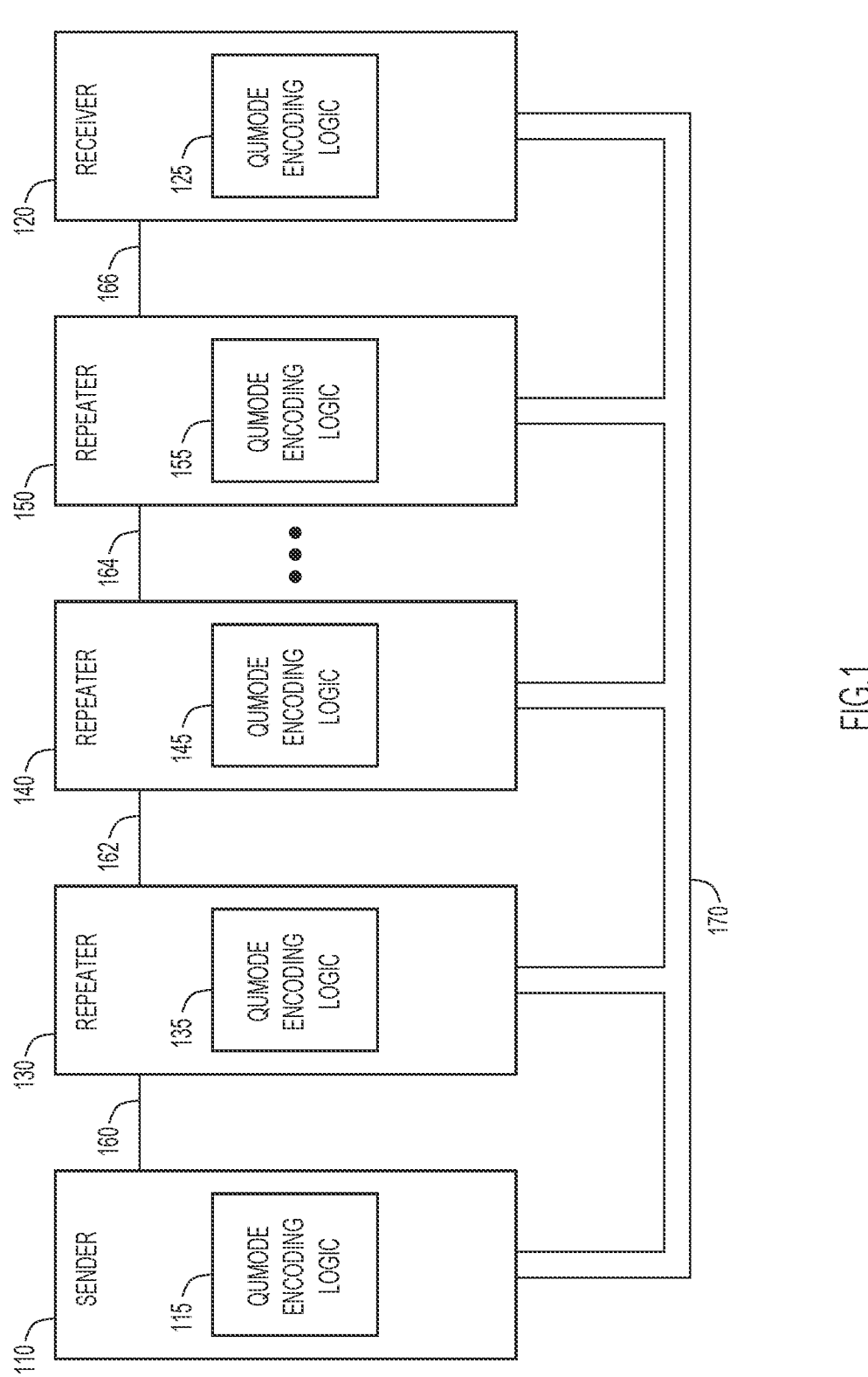
FIG. 1 is a simplified block diagram of a continuous variable quantum repeater system configured to send quantum information from a sender device to a receiver device, according to an example embodiment.

Referring now to FIG. 1, a block diagram illustrates a quantum communication system 100 that transmits quantum information from a sender device 110 to a receiver device 120. The sender device 110 includes qumode encoding logic 115 that enables the sender device 110 to encode a quantum signal as a CV qumode. The receiver device 120 includes qumode decoding logic 125 that enables the receiver device 120 to decode a data qumode and recover a quantum signal.

The quantum communication system 100 includes quantum repeaters 130, 140, and 150. The quantum repeaters 130, 140, and 150 include qumode repeater logic 135, 145, and 155, respectively, which enable the quantum repeaters to perform the techniques described herein. The sender device 110 is connected to the first quantum repeater 130 through a quantum channel 160. Similarly, the first quantum repeater 130 is connected to the second quantum repeater 140 through a quantum channel 162. A quantum channel 164 connects the second quantum repeater 140 to the third quantum repeater 150, and a quantum channel 166 connects the third quantum repeater 150 to the receiver device 120. In addition to the quantum channels 160, 162, 164, and 166, a classical network 170 may also connect the sender device 110, the receiver device 120, and each of the quantum repeaters 130, 140, and 150.

In one example, the quantum data at the sender device 110 is encoded into a data qumode, which is entangled with an auxiliary qumode. The sender device 110 transmits both the data qumode and the auxiliary qumode over the quantum channel 160 to the first quantum repeater 130. The first quantum repeater 130 entangles the received data qumode and auxiliary qumode, both of which include errors from transmission through the quantum channel 160. The data qumode and the auxiliary qumode generally experience an error channel as they propagate through the same transmission channel. However, the added noise to each qumode is uncorrelated and random. Entangling the received data qumode and the received auxiliary qumode enables the first quantum repeater 130 to combine the effect of the error channel into noise signals that affect the data qumode and the auxiliary qumode separately.

The first quantum repeater 130 measures the auxiliary qumode to determine an indication of the combined error signal. The measurement results from measuring the auxiliary qumode allow the first quantum repeater 130 to apply an error correction to the data qumode to mitigate/reduce the effect of the combined error signal, while not necessarily completely eliminating the error signal. In one example, the quantum communication system 100 may use additional auxiliary qumodes to reduce the noise to an arbitrarily small value. For instance, in one scheme, using one auxiliary qumode enables the first quantum repeater 130 to reduce the noise by a factor of ½. In this scheme, using N auxiliary qumodes reduces the noise by a factor of $$\frac{1}{N+1}.$$

After the first quantum repeater 130 reduces the error from the quantum channel 160, the first quantum repeater 130 generates a new auxiliary qumode and entangles the corrected data qumode with the new auxiliary qumode before transmitting the entangled data qumode and auxiliary qumode to the second quantum repeater 140 over the quantum channel 162. Each quantum repeater repeats this process until the data qumode is recovered at the receiver device 120. Effectively, each quantum repeater reduces the noise in the data qumode by measuring the auxiliary qumode, which includes information on the noise channel experienced by both the data qumode and the auxiliary qumode.

In one example, the quantum communication system 100 may be used for Quantum Key Distribution (QKD) between the sender device 110 and the receiver device 120. The one-way communication through the quantum repeaters 130, 140, and 150 allows the sender device 110 to prepare and send a CV quantum state that the receiver device 120 measures to obtain potential bits for shared key. The sender device 110 and the receiver device 120 may share information about the preparation and measurement of the CV quantum state over the classical network 170. Based on the classical communication about the preparation and measurement of the CV quantum state, the sender device 110 and the receiver device 120 may agree on a shared key derived from the bits encoded in the CV quantum state.

Figure 2:
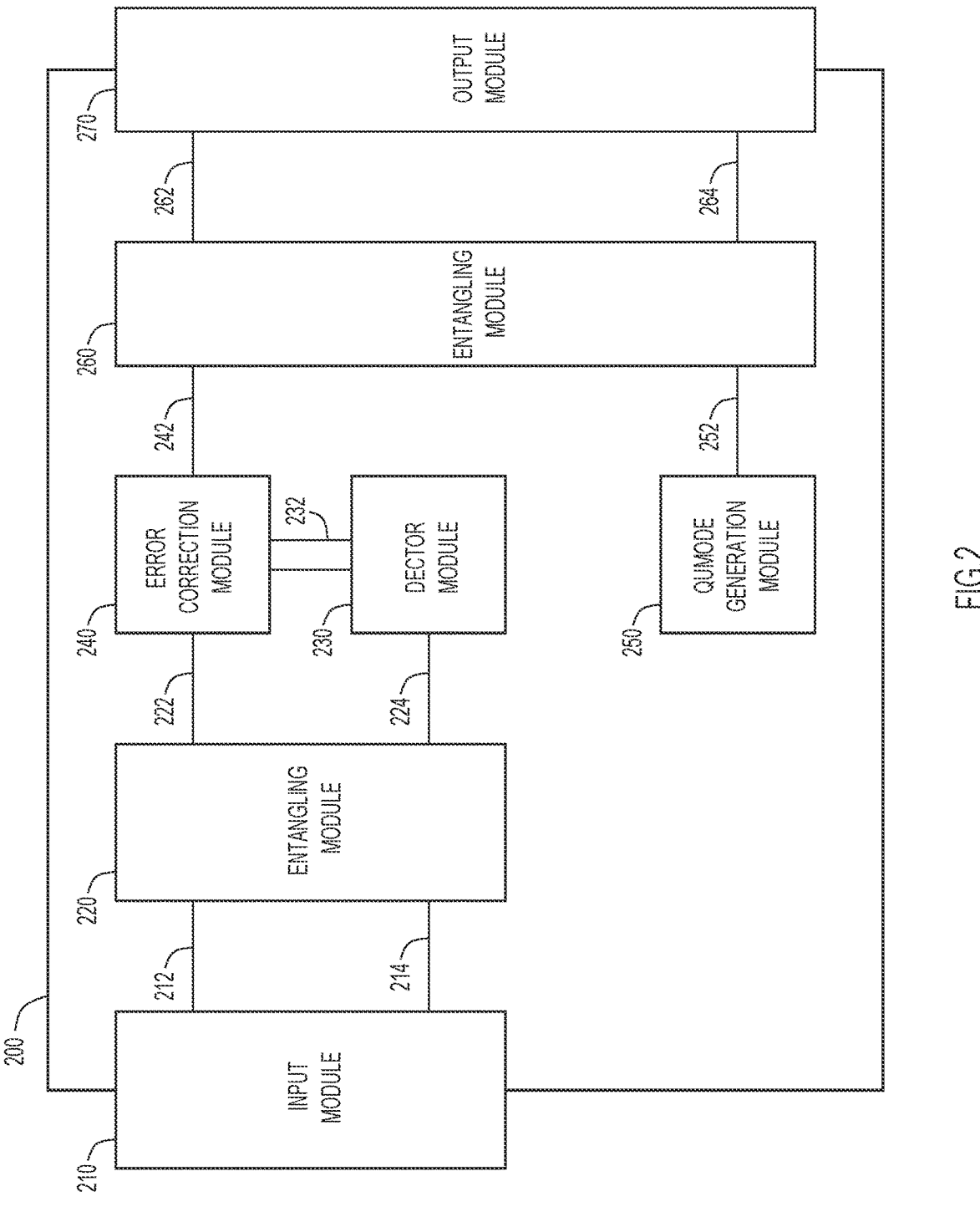
FIG. 2 is a simplified block diagram of a continuous variable quantum repeater.

Referring now to FIG. 2, a simplified block diagram illustrates an example of a quantum repeater 200 (e.g., quantum repeaters 130, 140, or 150). The quantum repeater 200 includes an input module 210 that is configured to receive signals encoded as qumodes from a quantum channel. In one example, the input module 210 may be configured to receive photonic signals. The input module 210 provides signals corresponding to a data qumode 212 and an auxiliary qumode 214 to an entangling module 220. In one example, the entangling module 220 may be a beam splitter that entangles or disentangles (using an inverse entangling gate) a photonic data qumode 212 with a photonic auxiliary qumode 214.

The entangling module 220 produces a data qumode 222 and an auxiliary qumode 224. The data qumode 222 includes the quantum information encoded in the received data qumode 212 and the effects of the noise channels affecting both the data qumode 212 and the auxiliary qumode 214. Similarly, the auxiliary qumode 224 includes the quantum state originally encoded in the auxiliary qumode 214 and the effects of the noise channels affecting both the data qumode 212 and the auxiliary qumode 214.

The quantum repeater 200 includes a detector module 230 that measures the auxiliary qumode 224 to generate a measurement result 232. In one example, the detector module 230 is a homodyne detector that measures the auxiliary qumode 224. In another example, the detector module 230 may include additional auxiliary modes which enable the detector module 230 to measure the quadrature modes of the auxiliary qumode 224 modulo some quantized values. The measurement result 232 includes information about the effects of the noise channels affecting both the data qumode

212 and the auxiliary qumode 214. The quantum repeater 200 also includes an error correction module 240 that applies an error correction to the data qumode 222 based on the measurement result 232 and generates a corrected data qumode 242.

The quantum repeater 200 includes a qumode generation module 250 that generates a new auxiliary qumode 252. In one example, the new auxiliary qumode 252 is a grid state, such as a Gottesman-Kitaev-Preskill (GKP) qubit. A second entangling module 260 of the quantum repeater 200 entangles the corrected data qumode 242 with the new auxiliary qumode 252 to generate an entangled data qumode 262 and an entangled auxiliary qumode 264 that are provided to an output module 270. The output module 270 of the quantum repeater 200 transmits the entangled data qumode 262 and the entangled auxiliary qumode 264 to the next hop, e.g., the receiver device or the next quantum repeater in the path to the receiver device.

Figure 3A:
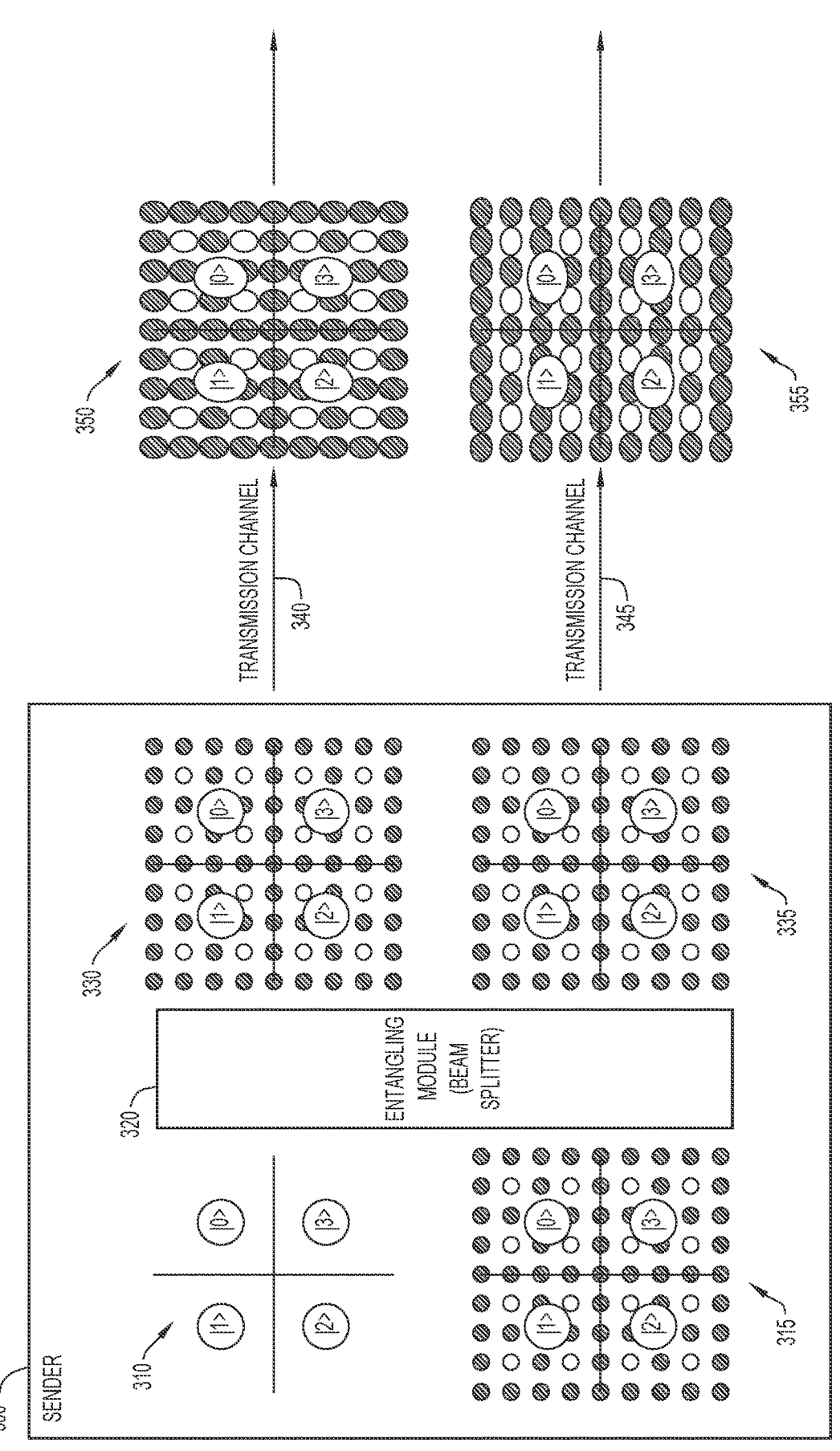
FIG. 3A illustrates the preparation and transmission of a continuous variable quantum signal, according to an example embodiment.
Figure 3B:
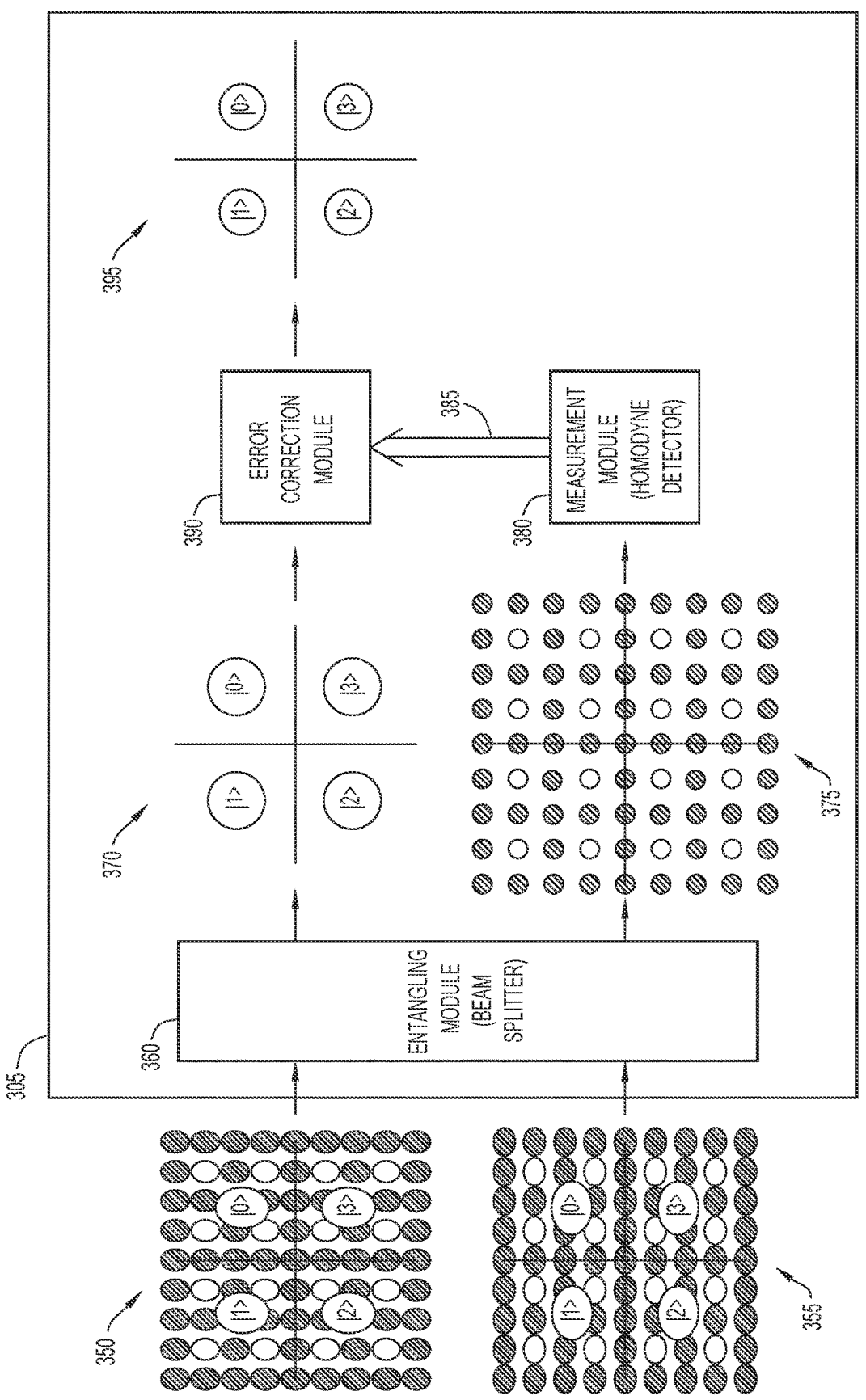
FIG. 3B illustrates the reception and recovery of a continuous variable quantum signal, according to an example embodiment.

Referring now to FIG. 3A and FIG. 3B, an example illustrates the qumodes sent by a sender 300 (e.g., the sender device 110 or a quantum repeater 130, 140, 150, or 200) to a receiver 305 (e.g., the receiver device 120 or a quantum repeater 130, 140, or 150). As shown in FIG. 3A, the sender 300 prepares a data qumode 310 and an auxiliary qumode 315. In one example, the data qumode 310 is encoded in one of a plurality of quantum states (e.g., |0>, |1>, |2>, and |3>) in a 4-QAM or Quadrature Phase Shift Key (QPSK) format. In another example, the auxiliary qumode 315 is encoded as a grid state (e.g., a GKP qubit). The sender 300 entangles the data qumode 310 and the auxiliary qumode 315 with an entangling module 320 (e.g., a beam splitter). The entangling module 320 generates an entangled qumode 330 and an entangled qumode 335 that are each a linear combination of the data qumode 310 and the auxiliary qumode 315.

The sender 300 transmits the entangled qumodes 330 and 335 through transmission channels 340 and 345, respectively. In one example, the transmission channels 340 and 345 have the same error channels but experience uncorrelated random noise. In other words, the entangled qumode 330 and the entangled qumode 335 may experience different error conditions. After traversing the transmission channels 340 and 345 and accumulating any errors from the respective noise signals, entangled qumodes 350 and 355 are provided to the receiver 305, as shown in FIG. 3B.

The receiver 305 sends the entangled qumodes 350 and 355 into an entangling module 360, such as a beam splitter. Due to the Hong-Ou-Mandel (HOM) effect and the indistinguishability of photons used for this CV quantum communication scheme, the entangling module 360 generate a data qumode 370 and an auxiliary qumode 375, both of which include parts of the error signal from both transmission channels 340 and 345. The receiver 305 measures the auxiliary qumode 375 with a measurement module 380 to generate measurement results 385. In one example, the measurement module 380 comprises a homodyne detector. This measures the random shift induced by the noise in the data qumode 370 and the auxiliary qumode 375. In another example, the receiver 305 measures the two stabilizers of the GKP qubit encoded in the auxiliary qumode 375 using two additional auxiliary GKP qubits and homodyne detectors.

An error correction module 390 in the receiver 305 obtains information about the errors in the auxiliary qumode 375 from the measurement results 385 and applies an error correction to the data qumode 370 to generate a corrected data qumode 395. In one example, the error correction applied by the error correction module 390 is proportional to the noise-induced shift measured by the measurement module 380. If the receiver 305 is a repeater (e.g., quantum repeater 130, 140, or 150), then the receiver 305 becomes the sender 300 by generating a new auxiliary qumode and entangling the corrected data qumode 395 with the new auxiliary qumode before transmitting the entangled qumodes to the next hop.

Referring now to FIG. 4, a flowchart illustrates an example process 400 performed by a first device (e.g., quantum repeater 200) to correct and retransmit a CV quantum data qumode by using an entangled auxiliary qumode. At 410, the first device receives a data qumode and a first auxiliary qumode that were entangled at a second device. In one example, the data qumode may be encoded in a QAM format. In another example, the first auxiliary qumode may be encoded as a grid state, such as a GKP qubit. In a further example, the data qumode and the first auxiliary qumode include the effect of different error channels experienced by the data qumode and the first auxiliary qumode in the transmission from the second device to the first device.

At 420, the first device entangles the data qumode and the first auxiliary qumode. In one example, entangling the data qumode and the first auxiliary qumode at the first device recovers the data qumode and the first auxiliary qumode, with each having errors from the error channel. At 430, the first device measures the first auxiliary qumode to generate an indication of the error channels experienced during transmission from the second device to the first device. In one example, the first device measures the first auxiliary qumode with a homodyne detector.

At 440, the first device applies an error correction to the data qumode based on the indication of error from the measurement results, which generates a corrected data qumode. In one example, the error correction comprises a unitary transformation on the data qumode. The first device generates a second auxiliary qumode at 450 and entangles the corrected data qumode with the second auxiliary qumode at 460. In one example, the second auxiliary qumode may be the same as the first auxiliary qumode generated at the second device. Alternatively, the second auxiliary qumode may be different from the first auxiliary qumode. In another example, additional auxiliary qumodes (e.g., a third auxiliary qumode, a fourth auxiliary qumode, etc.) may be entangled with the data qumode to improve the error correction at a subsequent quantum repeater or at the receiver endpoint. Additional auxiliary qumodes enable a receiver to reduce the noise in the data qumode to an arbitrarily small amount. For instance, in one error correction scheme, using N axillary qumodes allows the noise to be reduced by a factor of $$\frac{1}{N+1}.$$

However, increasing the number N of auxiliary qumodes also increases the time and resources spent at each quantum repeater to reduce the error signal from the incoming data qumode. The number of auxiliary qumodes may be selected for each quantum communication system as a design tradeoff between decreasing noise and increasing time/resource usage based on the available quantum processing technology.

At 470, the first device transmits the entangled corrected data qumode and second auxiliary qumode to a third device (e.g., a subsequent quantum repeater, or the receiver device).

In one example, the third device may perform a process corresponding to the process 400 using the second auxiliary qumode to correct for transmission errors between the first device and the third device.

Figure 5:
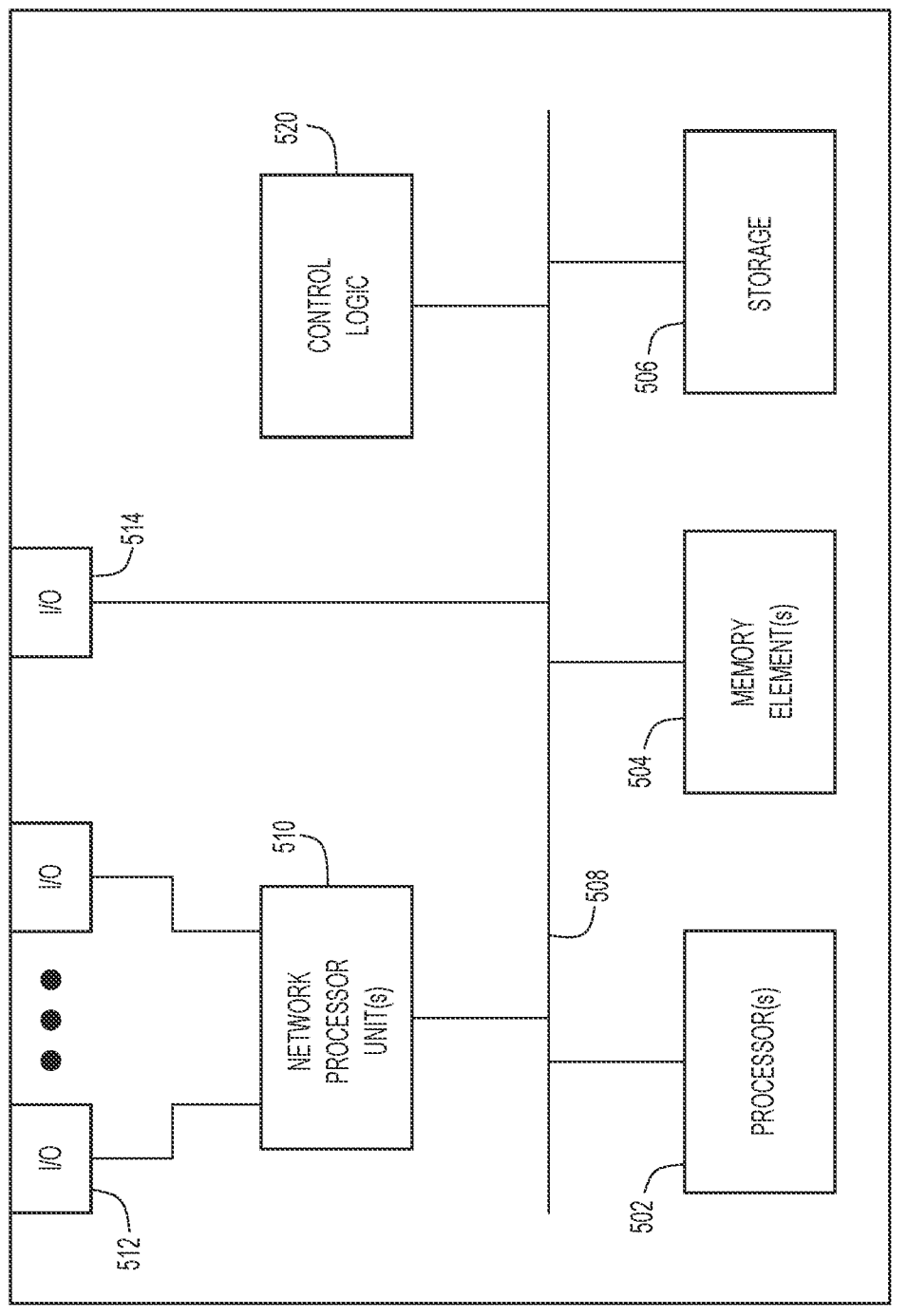
FIG. 5 is a block diagram of a computing device that may be configured to perform the techniques presented herein, according to an example embodiment.

Referring to FIG. 5, FIG. 5 illustrates a hardware block diagram of a computing device 500 that may perform functions associated with operations discussed herein in connection with the techniques depicted in FIGS. 1, 2, 3A, 3B, and 4. In various embodiments, a computing device, such as computing device 500 or any combination of computing devices 500, may be configured as any entity/entities as discussed for the techniques depicted in connection with FIGS. 1, 2, 3A, 3B, and 4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store quantum data, classical data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a classical network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein encode information into a CV qumode and use entangled auxiliary qumodes to compensate for errors accumulated in each transmission channel between quantum repeaters. The data qumode and the auxiliary qumode may be encoded in different formats. For instance, the data qumode may be encoded with a Gaussian format (e.g., QAM) and the auxiliary qumodes may be encoded as non-Gaussian formats (e.g., grid states, GKP qubits). The one-way communication of CV quantum states measured by homodyne detectors enables a cost-effective system for performing long distance QKD between endpoints.

In some aspects, the techniques described herein relate to a method including: receiving at a first device, a data qumode and a first auxiliary qumode from a second device, wherein the data qumode and the first auxiliary qumode were entangled at the second device; entangling the data qumode and the first auxiliary qumode at the first device; measuring the first auxiliary qumode to generate an indication of an error channel experienced by the data qumode; applying error correction to the data qumode based on the indication of the error channel, wherein the error correction mitigates an error in the data qumode and generates a corrected data qumode.

In some aspects, the techniques described herein relate to a method, wherein the data qumode is formatted according to a different standard than the first auxiliary qumode.

In some aspects, the techniques described herein relate to a method, wherein the data qumode is encoded according to a Quadrature Amplitude Modulation (QAM) format, and wherein the first auxiliary qumode is encoded as a Gottesman-Kitaev-Preskill (GKP) state.

In some aspects, the techniques described herein relate to a method, further including: generating a second auxiliary qumode at the first device; entangling the corrected data qumode with the second auxiliary qumode; and transmitting the corrected data qumode and the second auxiliary qumode to a third device.

In some aspects, the techniques described herein relate to a method, wherein the data qumode is formatted according to a different standard than the first auxiliary qumode and the second auxiliary qumode.

In some aspects, the techniques described herein relate to a method, wherein the data qumode is encoded according to a Quadrature Amplitude Modulation (QAM) format, and wherein the first auxiliary qumode and the second auxiliary qumode are encoded as grid states.

In some aspects, the techniques described herein relate to a method, wherein the grid states are Gottesman-Kitaev-Preskill (GKP) states.

In some aspects, the techniques described herein relate to a method, wherein measuring the first auxiliary qumode includes measuring the first auxiliary qumode with a homodyne detector.

In some aspects, the techniques described herein relate to a method, wherein entangling the data qumode and the first auxiliary qumode at the first device includes: directing the data qumode into a first port of a beam splitter; and directing the first auxiliary qumode into a second port of the beam splitter.

In some aspects, the techniques described herein relate to a method, wherein the data qumode encodes a quantum state for Quantum Key Distribution (QKD).

In some aspects, the techniques described herein relate to an apparatus including: an input module configured to receive a data qumode and a first auxiliary qumode from a remote device, wherein the data qumode and the first auxiliary qumode were entangled at the remote device; a first entangling module configured to entangle the data qumode and the first auxiliary qumode; a detector module configured to measure the first auxiliary qumode to generate an indication of an error channel experienced by the data qumode; and an error correction module configured to apply an error correction to the data qumode based on the indication of the error channel, wherein the error correction mitigates an error in the data qumode and generates a corrected data qumode.

In some aspects, the techniques described herein relate to an apparatus, wherein the data qumode is formatted according to a different standard than the first auxiliary qumode.

In some aspects, the techniques described herein relate to an apparatus, wherein the data qumode is encoded according to a Quadrature Amplitude Modulation (QAM) format, and wherein the first auxiliary qumode is encoded as a Gottesman-Kitaev-Preskill (GKP) state.

In some aspects, the techniques described herein relate to an apparatus, further including: a qumode generation module configured to generate a second auxiliary qumode; a second entangling module configured to entangle the corrected data qumode with the second auxiliary qumode; and an output module configured to transmit the corrected data qumode and the second auxiliary qumode to a subsequent device.

In some aspects, the techniques described herein relate to an apparatus, wherein the data qumode is formatted according to a different standard than the first auxiliary qumode and the second auxiliary qumode.

In some aspects, the techniques described herein relate to an apparatus, wherein the data qumode is encoded according to a Quadrature Amplitude Modulation (QAM) format, and wherein the qumode generation module is configured to encode the second auxiliary qumode as a grid state.

In some aspects, the techniques described herein relate to an apparatus, wherein the grid state is a Gottesman-Kitaev-Preskill (GKP) state.

In some aspects, the techniques described herein relate to an apparatus, wherein the detector module includes a homodyne detector.

In some aspects, the techniques described herein relate to an apparatus, wherein the first entangling module includes a beam splitter.

In some aspects, the techniques described herein relate to an apparatus, wherein the first entangling module is configured to entangle the data qumode and the first auxiliary qumode: directing the data qumode into a first port of the beam splitter; and directing the first auxiliary qumode into a second port of the beam splitter.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving at a first device, a data qumode and a first auxiliary qumode from a second device, wherein the data qumode and the first auxiliary qumode were entangled at the second device and the data qumode is an encoded representation of a quantum signal;
   entangling the data qumode and the first auxiliary qumode at the first device;
   measuring the first auxiliary qumode to generate an indication of an error channel experienced by the data qumode; and
   applying an error correction to the data qumode based on the indication of the error channel, wherein the error correction mitigates an error in the data qumode and generates a corrected data qumode.

2. The method of claim 1, wherein the data qumode is formatted according to a different standard than the first auxiliary qumode.

3. The method of claim 2, wherein the data qumode is encoded according to a Quadrature Amplitude Modulation (QAM) format,
   wherein the first auxiliary qumode is encoded as a Gottesman-Kitaev-Preskill (GKP) state.

4. The method of claim 1, further comprising:
   generating a second auxiliary qumode at the first device;
   entangling the corrected data qumode with the second auxiliary qumode; and
   transmitting the corrected data qumode and the second auxiliary qumode to a third device.

5. The method of claim 4, wherein the data qumode is formatted according to a different standard than the first auxiliary qumode and the second auxiliary qumode.

6. The method of claim 5, wherein the data qumode is encoded according to a Quadrature Amplitude Modulation (QAM) format,
   wherein the first auxiliary qumode and the second auxiliary qumode are encoded as grid states.

7. The method of claim 6, wherein the grid states are Gottesman-Kitaev-Preskill (GKP) states.

8. The method of claim 1, wherein measuring the first auxiliary qumode comprises measuring the first auxiliary qumode with a homodyne detector.

9. The method of claim 1, wherein entangling the data qumode and the first auxiliary qumode at the first device comprises:

directing the data qumode into a first port of a beam splitter; and directing the first auxiliary qumode into a second port of the beam splitter.

10. The method of claim 1, wherein the data qumode encodes a quantum state for Quantum Key Distribution (QKD).

11. An apparatus comprising:

a beam splitter;

a detector; and a computing device of a quantum communication system configured to perform operations including:

receiving a data qumode and a first auxiliary qumode from a remote device of the quantum communication system, wherein the data qumode and the first auxiliary qumode were entangled at the remote device and the data qumode is an encoded representation of a quantum signal;

entangling the data qumode and the first auxiliary qumode via the beam splitter;

measuring the first auxiliary qumode, via the detector, to generate an indication of an error channel experienced by the data qumode; and applying an error correction to the data qumode based on the indication of the error channel, wherein the error correction mitigates an error in the data qumode and generates a corrected data qumode.

12. The apparatus of claim 11, wherein the data qumode is formatted according to a different standard than the first auxiliary qumode.

13. The apparatus of claim 12, wherein the data qumode is encoded according to a Quadrature Amplitude Modulation (QAM) format, wherein the first auxiliary qumode is encoded as a Gottesman-Kitaev-Preskill (GKP) state.

14. The apparatus of claim 11, wherein the data qumode encodes a quantum state for Quantum Key Distribution (QKD) the computing device is configured to perform further operations including:

generating a second auxiliary qumode;

entangling the corrected data qumode with the second auxiliary qumode; and transmitting the corrected data qumode and the second auxiliary qumode to a subsequent device.

15. The apparatus of claim 14, wherein the data qumode is formatted according to a different standard than the first auxiliary qumode and the second auxiliary qumode.

16. The apparatus of claim 15, wherein the data qumode is encoded according to a Quadrature Amplitude Modulation (QAM) format, wherein the second auxiliary qumode is encoded as a grid state.

17. The apparatus of claim 16, wherein the grid state is a Gottesman-Kitaev-Preskill (GKP) state.

18. The apparatus of claim 11, wherein the detector comprises a homodyne detector.

19. The apparatus of claim 11, wherein the data qumode encodes a quantum state for Quantum Key Distribution (QKD).

20. The apparatus of claim 11, wherein entangling the data qumode and the first auxiliary qumode comprises:

directing the data qumode into a first port of the beam splitter; and directing the first auxiliary qumode into a second port of the beam splitter.

\* \* \* \* \*